United States Patent
Aretz et al.

(10) Patent No.: US 6,766,170 B1
(45) Date of Patent: Jul. 20, 2004

(54) METHOD FOR THE RADIO COVERAGE OF A MOBILE TERMINAL OF A MOBILE RADIO NETWORK

(75) Inventors: Kurt Aretz, Isselburg (DE); Edgar Bolinth, Mönchengladbach (DE); Erich Kamperschroer, Hamminkeln (DE); Uwe Schwark, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/787,959

(22) PCT Filed: Sep. 22, 1999

(86) PCT No.: PCT/DE99/03033

§ 371 (c)(1),
(2), (4) Date: Mar. 22, 2001

(87) PCT Pub. No.: WO00/18152

PCT Pub. Date: Mar. 30, 2000

(30) Foreign Application Priority Data

Sep. 22, 1998 (DE) .......................................... 198 43 476

(51) Int. Cl.⁷ .............................. H04Q 7/20; H04Q 7/38
(52) U.S. Cl. ....................... 455/436; 455/437; 455/438; 455/462; 370/331
(58) Field of Search ................................ 455/436, 437, 455/438, 439, 440, 403, 422.01, 426.01, 445, 432, 462, 463, 465, 550, 9, 11.1, 517; 370/331

(56) References Cited

U.S. PATENT DOCUMENTS

| | | | | |
|---|---|---|---|---|
| 5,911,120 A | * | 6/1999 | Jarrett et al. | 455/436 |
| 6,236,860 B1 | * | 5/2001 | Hagting et al. | 455/436 |
| 6,327,470 B1 | * | 12/2001 | Ostling | 455/437 |

FOREIGN PATENT DOCUMENTS

| | | |
|---|---|---|
| EP | 0 719 064 A2 | 6/1996 |
| WO | WO 96/25808 | 8/1996 |
| WO | WO 96/38988 | 12/1996 |

* cited by examiner

Primary Examiner—William Trost
Assistant Examiner—Keith Ferguson
(74) Attorney, Agent, or Firm—Bell, Boyd & Lloyd LLC

(57) ABSTRACT

A method for the radio coverage of a mobile terminal of a mobile radio network in the catchment area of an intermediate station which is used as a converter, wherein: in the case of an existing connection between the mobile radio network and the mobile terminal, a connection is first set up on an internal frequency and the connection is then handled via the intermediate station; in the case of an existent connection from a mobile terminal via an intermediate station to the mobile radio network, the intermediate station will hand over the connection to the mobile terminal again directly to the mobile radio network when the mobile terminal is removed from the internal area of reception; and in the case of a new setting-up of a connection from the mobile terminal to the mobile radio network, for setting up the connection, the mobile terminal first, or after an unsuccessful connection set-up attempt with a mobile radio frequency, attempts to establish connection to an intermediate station on an internal frequency.

20 Claims, 1 Drawing Sheet

METHOD FOR THE RADIO COVERAGE OF A MOBILE TERMINAL OF A MOBILE RADIO NETWORK

BACKGROUND OF THE INVENTION

1. Field of the Invention

The present invention relates to a method for the radio coverage of a mobile terminal of a mobile radio network in the catchment area of an intermediate station which is used as a adverter.

2. Description of the Prior Art

The subscribers of such a modern mobile radio network can be currently reached at almost any location in the world. However, the general problem is that the connection to the mobile radio network is broken for subscribers entering a relatively large building, due to shielding by metal constructions or window frontages with metallized windows. This problem has hitherto been solved by installing base stations of the mobile radio network operator inside correspondingly large and mostly public buildings so that this area, too, is covered by the mobile radio network itself.

This procedure has the disadvantage that the officially issued frequencies of the mobile radio network must be used and the base stations must also must be connected to the normal landline network of the mobile radio network operator.

On the other hand, there is also the possibility of using subsystems which communicate on frequencies not belonging to the public mobile radio network with mobile terminals in the in-house area. In these systems, however, the communication is such that an early decision is made, by choosing either a corresponding mobile terminal for the corresponding frequency or, in the case of mobile terminals having combined frequency systems, by selecting a certain frequency or a certain mode, whether connection is established with the public mobile radio network or with an in-house cordless telecommunication network. In any case, this does not solve the problem of the transition from a public mobile radio network to an in-house mobile radio network.

From DE 195 32 635, a digital telephone system for wireless communication with a fixed station, a mobile handset and a regenerator/converter device is known in which the mobile handset can be assigned both first frequencies of a first frequency band and second frequencies of a second frequency band which is disjoint from the first frequency band and the regenerator/converter device is provided with a first and a second radio interface, in which arrangement first frequencies can be assigned to the first radio interface and second frequencies can be assigned to the second radio interface and in which the first radio interface has the functionality of a mobile handset and the second radio interface has the functionality of a fixed station.

It is an object of the present invention, therefore, to specify a method which describes the problem of transition from a public mobile radio network to an in-house mobile radio network, a case distinction having to be made with respect to the entry and the exit into the in-house area of reception, and the new setting-up of a connection in the in-house area to the mobile radio network.

SUMMARY OF THE INVENTION

Accordingly, the present invention is directed to a method for the radio coverage of a mobile terminal of a mobile radio network wherein, in the case of an existing connection between the mobile radio network and a mobile terminal which approaches the internal area of reception of an intermediate station, a connection is first set up between this mobile terminal and this intermediate station on the internal frequency, via which connection the individual features of the mobile terminal are handed over to the intermediate station and then a handover of the connection takes place between mobile terminal and mobile radio network due to which a connection from the mobile radio network via the intermediate station to the mobile station is produced. These method steps thus take into consideration the situation of a mobile terminal which is already communicating with the mobile radio network on entry into the internal area of reception of an intermediate station.

In another embodiment, the method of the present invention also takes into consideration the situation when a mobile terminal has set up a connection to the mobile radio network via an intermediate station and is now leaving the internal area of reception of the intermediate station. Accordingly, in the case of an existing connection from a mobile terminal via an intermediate station to the mobile radio network, the intermediate station detects a removal of the mobile terminal from the internal area of reception of the intermediate station, forwards the frequency and the connection information to the mobile radio network to the mobile terminal and then a handover of the mobile radio network-intermediate station-mobile terminal connection to the mobile radio network-mobile terminal connection takes place.

According to another embodiment of the present invention, the method is improved to the extent that, in the case when a new connection is set up from the mobile terminal to the mobile radio network, for setting up the connection, the mobile terminal first, or after an unsuccessful connection set-up attempt with a mobile radio frequency, attempts to establish a connection to an intermediate station on an internal frequency.

According to another embodiment of the present invention, it is also possible that a combination of the characterizing features of each of the above there embodiment can occur depending on the situation of the movement of the mobile terminal.

According to a further embodiment of the present invention, the connections can operate, for example, in accordance with the TDMA (Time Division Multiple Access) method and/or the FDMA (Frequency Division Multiple Access) method and/or the CDMA (Code Division Multiple Access) method.

According to yet another embodiment of the method described above, it is proposed that the intermediate station converts an incoming signal according to the FDD (Frequency Division Duplex) method to an outgoing signal according to the TDD (Time Division Duplex) method and, on the other hand, converts an incoming signal according to the TDD method to an outgoing signal according to the FDD method. As a rule, the incoming signal according to the FDD method will be a signal of the mobile radio network whereas the signal according to the TDD method will be associated with the in-house radio network.

A further advantageous embodiment of the method according of the present invention consists in that, before a connection is taken over by the intermediate station, an exchange of a PIN (Personal Identification Number) takes place between the mobile terminal and the intermediate station and that the handover procedure is only initiated if the mobile terminal is authorized on the basis of the PIN. The prerequisite for this is, naturally, that the intermediate station has a data memory in which the PINs of the authorized subscribers are stored.

To detect an approaching mobile terminal, it can be advantageous if the intermediate station periodically monitors the at least one internal frequency for a message sent by an approaching mobile terminal. Naturally, the mobile terminal must also periodically send out corresponding messages to carry out this method.

In the reverse case, it also can be advantageous if, to detect the penetration of a mobile terminal into the internal area of reception of the intermediate station, the mobile terminal itself monitors the internal frequency periodically for messages sent by an intermediate station. For this purpose, it is necessary, in turn, that the corresponding intermediate station sends out such messages periodically via its internal frequency.

Another advantageous embodiment of the method of the present invention contemplates, that the intermediate station, to detect the migration of the mobile terminal out of the internal area of reception, evaluates the bit error rate occurring during the communication between intermediate station and mobile terminal and, when a predetermined value is exceeded, assumes that the mobile terminal is migrating away.

Another advantageous embodiment of the method with respect to the detection of the emigration of the mobile terminal from the internal area of reception of an intermediate station, contemplates that the intermediate station measures the transmit and receive power of the mobile terminal at regular intervals or continuously and, when the power drops below a certain level, assumes that the mobile terminal is migrating out of the internal area of reception.

Other advantageous embodiments of the method consider, for example, that the intermediate station also communicates with a landline network in addition to its connection with the mobile radio network. This can be, for example, an ISDN (Integrated Services Digital Network) or a PSTN (Public Switched Telephone Network).

It is also advantageous in a communication between the intermediate station and a landline network and a radio network if the intermediate station can either independently switch between both networks or switches on request by the mobile terminal.

The mobile radio network currently to be considered is, for example, a GSM (Global System for Mobile Communications) network or a UMTS (Universal Mobile Telecommunication System) network. To actually implement the method of the present invention, for example in a GSM network, it is necessary to provide some still available GSM frequencies for the in-house area. In the case of a UMTS network, it can be assumed that some frequencies will be provided for the in-house area from the start. The advantage resulting from the provision of such in-house frequencies lies in the fact that the frequency planning for the external area is in no way influenced. A further advantage of the method represented lies in the fact that the intermediate station is only connected to the GSM/UMTS base stations via an air interface and only simulates a mobile terminal with respect to this base station. In this manner, the remaining network infrastructure remains completely free of reactions as a result of which a corresponding method also can be integrated without extra cost to the operators of the mobile radio networks.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
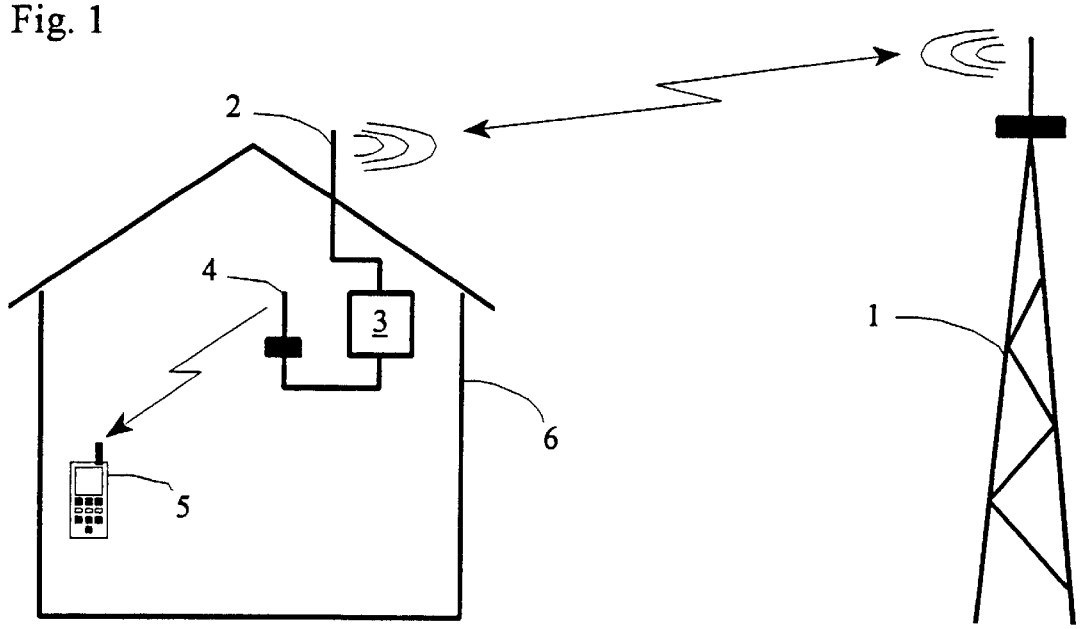
FIG. 1 represents a converter solution for improving in-house mobile radio coverage.

FIG. 1 shows a diagrammatic section of a mobile radio network including a base station 1 and a private building 6 which is suitable for carrying out the method according to the present invention. The base station 1 can be, for example, a GSM base station or a UMTS base station, in the transmitting/receiving area of which a private building 6 is located. The private building 6 is equipped with an intermediate station 3 which, on the one hand, has an external antenna 2 via which it can establish connection with the mobile radio network, that is to say with the base station 1, via an external frequency. Inside the building there is another antenna 4 for the internal frequency which is connected to the intermediate station 3. The internal frequency covers the in-house area so that mobile terminals 5 located therein can establish contact with the mobile radio network via the intermediate station 3 via this antenna. The transmitting/receiving area of the internal frequency in most cases extends into the immediate vicinity of the building depending on the shielding conditions.

According to the method of the present invention, the intermediate station 3 detects a mobile terminal 5 approaching the building 6 via the internal frequency. As soon as the intermediate station has established connection with the mobile terminal 5 on the internal frequency, mobile-terminal-specific and network-specific data such as, for example, the external transmission frequency used, timing advance, frame number, transmitter power or PIN are exchanged so that the intermediate station can perform a handover of the connection from base station 1 to mobile terminal 5 to the connection base station 1 via the intermediate station 3 to the mobile terminal 5.

The intermediate station 3 preferably converts the received external signal in FDD mode to the internal signal which is sent out via the antenna 4 in TDD mode.

Once the intermediate station has taken over the connection, it simulates to the base station 1 a mobile terminal which has the same individual features as the mobile terminal 5 now located in the internal area of the building 6. If the mobile terminal 5 leaves the internal area of the building 6, and thus the internal area of reception of the intermediate station 3, this will be detected by the intermediate station. This can be done, for example, by a bit error rate determination or by comparing the transmit/receive power of the mobile terminal. When the mobile terminal leaves the internal area of reception of the intermediate station 3, the connection which originally led from the base station 1 via the intermediate station 3 to the mobile terminal 5, is now handed back so that a direct connection base station 1 to mobile terminal 5 is produced.

A further scenario can be produced by the fact that a mobile terminal 5 is located inside the building 6 and has initially not set up a connection to the mobile radio network. In this case, the terminal 5, on attempting to set up the connection, will first either immediately establish connection with the intermediate station with the internal frequency or, after an unsuccessful attempt on the external frequency, will then change to the internal frequency and in this manner establish connection to the intermediate station. The mobile terminal 5 then hands its individual data to the intermediate station 3 so that the intermediate station 3 is then able to simulate the mobile terminal 5 itself with respect to the base station 1. Thus, a connection from mobile terminal 5 via intermediate station 3 to base station 1 is again established, the intermediate station preferably acting as converter between the TDD method and FDD method.

Figure 2:
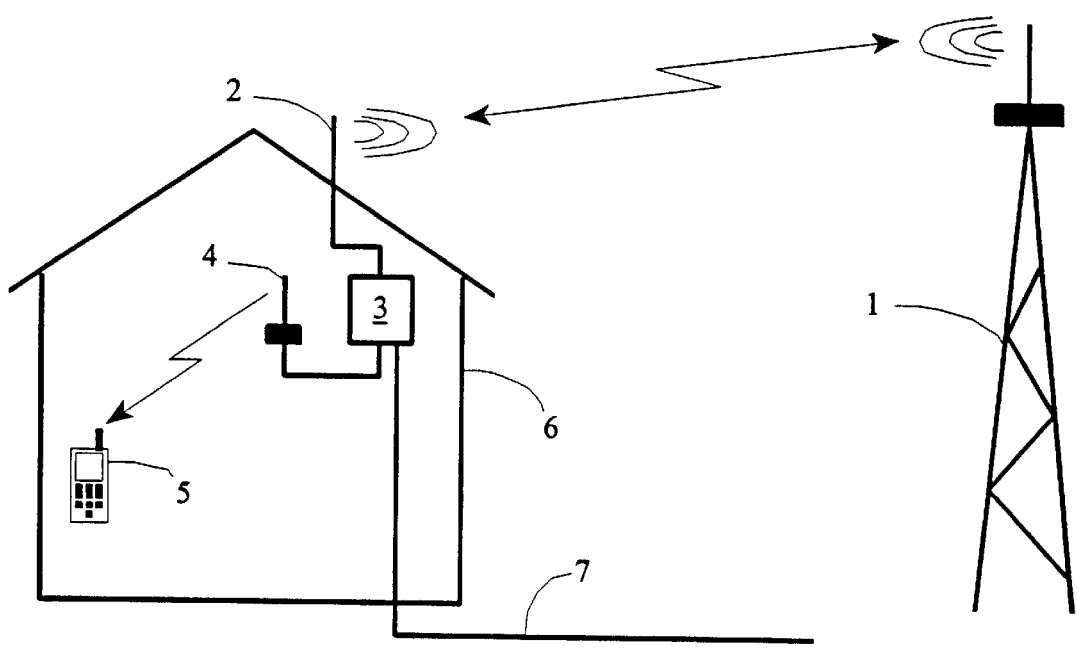
FIG. 2 represents a converter solution with additional connection to the landline network.

FIG. 2 shows an expansion of the situation from FIG. 1, the intermediate station 3 here exhibiting an additional connection 7 to a landline telecommunication network. The landline network can be for example, a PSTN or ISDN telephone network. There is no distinction from the method described under FIG. 1 with respect to the method used with an approach or with the removal of the mobile terminal 5 to/from the building. In addition, however, a connection from mobile terminal 5 via intermediate station 3 to a landline network can be established via connection 7 in this example. The decision about the telecommunication network via which a connection set up from mobile terminal 5 is established can be made either by the user himself or also via a corresponding automatic selection of the intermediate station 3. In any case, this provides the user of a mobile terminal 5 with the possibility of being available from the outside both via the landline network and via the mobile radio network.

Thus, the method according to the present invention provides for the transition from a public mobile radio network to an in-house mobile radio network, a different method for the handover of the connection being proposed depending on the situation, namely entry of the mobile network into the in-house area of reception or exit from the in-house area of reception in the case of an existing connection to the mobile radio network, or also the new setting-up of a connection in the in-house area.

Although the present invention has been described with reference to specific embodiments, those of skill in the art will recognize that changes may be made thereto without departing from the spirit and scope of the invention as set forth in the hereafter appended claims.

We claim:

1. A method for radio coverage of a mobile terminal of a mobile radio network in a catchment area of an intermediate station, which can communicate with at least one base station, the intermediate station and the mobile terminal operating at both at least one frequency of the mobile radio network with an external area of reception and at least one further internal frequency with an internal area of reception which is not used as a connection frequency of the mobile radio network, the method comprising the steps of:

simulating to the mobile radio network, via the intermediate station, a mobile terminal on a mobile radio frequency and simultaneously communicating with the mobile terminal via an internal frequency;

setting up a connection, in the case of an existing connection between the base station and a mobile terminal which is approaching the area of reception of the intermediate station, between the mobile terminal and the intermediate station on the internal frequency;

handing over, via the connection, individual features of the mobile terminal to the intermediate station; and handing over the connection between the mobile terminal and the mobile radio network via which a further connection is established from the mobile radio network via the intermediate station to the mobile terminal.

2. A method for radio coverage of a mobile terminal of a mobile radio network in a catchment area of an intermediate station as claimed in claim 1, the method further comprising the steps of:

detecting, via the intermediate station and in the case of an existing connection from the mobile terminal via the intermediate station to the mobile radio network, a removal of the mobile terminal from the internal area of reception of the intermediate station;

forwarding, via the intermediate station, the frequency and connection information to the mobile radio network to the mobile terminal; and effecting a hand over of the mobile radio network-intermediate station-mobile terminal connection to the mobile radio network-mobile terminal connection.

3. A method for radio coverage of a mobile terminal of a mobile radio network in a catchment area of an intermediate station as claimed in claim 1, wherein, in the case when a new connection is set up from the mobile terminal to the mobile radio network, the mobile terminal attempts to establish a connection to the intermediate station on the internal frequency, the attempt occurring one of prior to and after an unsuccessful connection set-up attempt with the mobile radio frequency.

4. A method for radio coverage of a mobile terminal of a mobile radio network in a catchment area of an internal station as claimed in claim 1, wherein the connections operate in accordance with at least one of a Time Division Multiple Access method, a Frequency Division Multiple Access method, and a Code Division Multiple Access method.

5. A method for radio coverage of a mobile terminal of a mobile radio network in a catchment area of an intermediate station as claimed in claim 4, wherein the intermediate station performs at least one conversion between at least one of the Time Division Multiple Access method, the Frequency Division Multiple Access method, and the Code Division Multiple Access method on transition from the external frequency to the internal frequency and conversely.

6. A method for radio coverage of a mobile terminal of a mobile radio network in a catchment area of an intermediate station as claimed in claim 1, the method further comprising the step of:

performing a conversion, via the intermediate station, of an incoming signal according to a Frequency Division Duplex method to an outgoing signal according to a Time Division Duplex method and conversely.

7. A method for radio coverage of a mobile terminal of a mobile radio network in a catchment area of an intermediate station as claimed in claim 1, wherein the mobile radio network-intermediate station connection is operated in accordance with a Frequency Division Duplex method and the intermediate station-mobile terminal connection is operated in accordance with a Time Division Duplex method.

8. A method for radio coverage of a mobile terminal of a mobile radio network in a catchment area of an intermediate station as claimed in claim 1, the method further comprising the step of:

effecting an exchange of a PIN, prior to the connection being taken over by the intermediate station, the hand over procedure being initiated only upon the exchange of an authorized PIN.

9. A method for radio coverage of a mobile terminal of a mobile radio network in a catchment area of an intermediate station as claimed in claim 1, the method further comprising the step of:

periodically monitoring, via the intermediate station so as to detect an approaching mobile terminal, the at least one internal frequency for a message sent by the approaching mobile terminal which possibly contains mobile-terminal-specific information.

10. A method for radio coverage of a mobile terminal of a mobile radio network in a catchment area of an intermediate station as claimed in claim 1, the method further comprising the step of:

monitoring, via the mobile terminal, the internal frequency periodically for messages sent by the intermediate station to detect penetration of a mobile terminal into the internal area of reception of the intermediate station.

11. A method for radio coverage of a mobile terminal of a mobile radio network in a catchment area of an intermediate station as claimed in claim 1, the method further comprising the step of:

using a message transmitted several times for a restricted period upon initiation of a user which contains mobile-terminal-specific information for detection of a mobile terminal approaching the intermediate station.

12. A method for radio coverage of a mobile terminal of a mobile radio network in a catchment area of an intermediate station as claimed in claim 1, the method further comprising the step of:

using a bit error rate, by the intermediate station, occurring for detecting migration of the mobile terminal out of the internal area of reception.

13. A method for radio coverage of a mobile terminal of a mobile radio network in a catchment area of an intermediate station as claimed in claim 1, the method further comprising the step of:

using a change in measured transmit and receive powers, by the intermediate station, for detecting migration of the mobile terminal out of the internal area of reception.

14. A method for radio coverage of a mobile terminal of a mobile radio network in a catchment area of an intermediate station as claimed in claim 1, wherein the mobile radio network is a Global System for Mobile Communications network.

15. A method for radio coverage of a mobile terminal of a mobile radio network in a catchment area of an intermediate station as claimed in claim 1, wherein the mobile radio network is a Universal Mobile Telecommunications System network.

16. A method for radio coverage of a mobile terminal of a mobile radio network in a catchment area of an intermediate station as claimed in claim 1, wherein communication on the internal frequencies is handled in accordance with a DECT principle.

17. A method for radio coverage of a mobile terminal of a mobile radio network in a catchment area of an intermediate station as claimed in claim 1, wherein the intermediate station additionally communicates with a landline network.

18. A method for radio coverage of a mobile terminal of a mobile radio network in a catchment area of an intermediate station as claimed in claim 17, wherein the landline network is an Integrated Services Digital Network.

19. A method for radio coverage of a mobile terminal of a mobile radio network in a catchment area of an intermediate station as claimed in claim 17, wherein the landline network is a Public Switched Telephone Network.

20. A method for radio coverage of a mobile terminal of a mobile radio network in a catchment area of an intermediate station as claimed in claim 1, wherein the intermediate station can switch between landline network and radio network.

* * * * *